(12) United States Patent
Malenke et al.

(10) Patent No.: US 7,704,131 B1
(45) Date of Patent: Apr. 27, 2010

(54) APPARATUS FOR FORMING SPACED INTERVALS IN A STUFFED CASING AND METHOD THEREOF

(75) Inventors: Mark Ervin Malenke, Sun Prairie, WI (US); Vernon Donald Karman, Poynette, WI (US)

(73) Assignee: Kraft Foods Global Brands LLC, Northfield, IL (US)

( * ) Notice: Subject to any disclaimer, the term of this patent is extended or adjusted under 35 U.S.C. 154(b) by 0 days.

(21) Appl. No.: 12/345,852

(22) Filed: Dec. 30, 2008

(51) Int. Cl.
*A22C 11/00* (2006.01)

(52) U.S. Cl. .................................................. 452/46

(58) Field of Classification Search ............. 452/21–26, 452/30–33, 35–38, 46–48, 51; 198/626.2, 198/626.4–626.6, 844.1
See application file for complete search history.

(56) References Cited

U.S. PATENT DOCUMENTS

| | | | | |
|---|---|---|---|---|
| 4,129,923 A | * | 12/1978 | Hoegger | 452/46 |
| 4,614,005 A | | 9/1986 | Townsend | |
| 4,905,349 A | * | 3/1990 | Townsend | 452/32 |
| 6,125,991 A | | 10/2000 | Veldkamp et al. | |
| 6,482,079 B1 | * | 11/2002 | Nakamura et al. | 452/47 |
| 6,558,241 B2 | * | 5/2003 | Hergott et al. | 452/31 |
| 7,381,123 B2 | * | 6/2008 | Bachtle | 452/46 |
| 7,467,705 B2 | * | 12/2008 | Lutz et al. | 198/598 |

FOREIGN PATENT DOCUMENTS

WO 9605733 A1 2/1996

* cited by examiner

*Primary Examiner*—Thomas Price
(74) *Attorney, Agent, or Firm*—Fitch, Even, Tabin & Flannery

(57) ABSTRACT

A flexible, composite unitary belt for forming spaced intervals in a stuffed casing, and method therefore, the belt cooperating with another belt to pinch the stuffed casing. The belt comprises a body forming a continuous loop and having at least one embedded flexible reinforcing member extending throughout. Additionally, the belt has at least one pinching member extending outwardly from the body and positioned to cooperate with a pinching member of another belt to pinch the stuffed casing when fed between the belts and pinched by the pinching members.

20 Claims, 3 Drawing Sheets

APPARATUS FOR FORMING SPACED INTERVALS IN A STUFFED CASING AND METHOD THEREOF

FIELD

The present application relates generally to an apparatus for pinching a stuffed casing at spaced intervals and, in particular, a flexible unitary composite belt for cooperating with another belt to pinch a stuffed casing at spaced intervals, and methods thereof.

BACKGROUND

In the food industry flowable foods can be contained in a casing or outer sleeve. One example of this is the packaging of meats, such as sausages or frankfurters, where a ground meat product is provided in a flowable state and is inserted into a casing, which results in the final form of the sausages or frankfurters that end up packaged and for sale on the market. A single, unitary casing filled with the flowable food can result in a single cylindrical filled tube. In order to obtain smaller length filled tubes or casings that are more conducive to sale on the retail market, the single filled tube can be pinched at a series of spaced intervals and/or twisted to create dividing points that segregate segments of the product into multiple, linked filled food products having much shorter lengths than the single filled tube.

There are many current ways to carry out the pinching technique that creates an unfilled space within the casing that makes up the spaced interval. One technique is to use a pair of opposing metal pinchers or butterfly links on a pair of rotating belts that can contain a notch therein where the opposite pinchers nest together with one another and tighten around a portion of the filled casing that travels between them. Thus, as the pair of pinchers come together with the filled casing therebetween, they apply enough pressure to evacuate enough of the filled food from an area of the casing to create a space for later twisting. These pinchers can be made of steel and mounted upon a chain link belt to advance the pinchers adjacent to the filled casing traveling in a machine direction between the pair of rotating belts containing the pinchers.

One problem encountered with the use of pinchers on steel chains is that the chains can stretch as they are run at rapid speeds alongside the casings. Accordingly, the chains are often not run at such high speeds, however, at the expense of process efficiency. Another problem with such chains is that they can become stretched, which can create gaps or pinch points between the chains that can catch the casing and undesirably pinch and/or tear the casing.

SUMMARY

Apparatus and methods for forming a series of spaced intervals in a stuffed casing are provided herein, where a flowable food product, such as a meat product, is filled inside of a casing which is advanced in a machine direction between a pair of flexible composite unitary belts having pinching members that pinch the casing at the spaced intervals to at least partially evacuate that section of food product. The evacuated sections of the casing may subsequently be rotated or twisted to form an obstruction in the casing to segregate multiple segments of the stuffed casing, thus forming multiple food products that are linked together by the obstruction points.

The flexible composite unitary belts are comprised of a flexible material that is durable, allowing the belt to be operated at high speeds. The flexible composite material can comprise a reinforcing member that allows the belt to bend and flex, preventing stretch and wear of the belt, thus prolonging the life of the belt and allowing for potentially faster operating speeds. The material of the belt and the fact that it is unitary can help prevent tearing or other damage to the casing as it is in contact with the belt. Furthermore, the pinching members can be attached to the belt so that the pinching members are joined to the belt forming a relatively unitary unit.

The apparatus, or pinching station, can comprise a belt that cooperates with another belt to pinch or partially evacuate the stuffed casing. The belts each may have a flexible, unitary composite body with at least one embedded flexible reinforcing member or cable extending substantially the entire length of the body and the body further forming a continuous or nearly continuous loop. Preferably, multiple embedded flexible reinforcing cables can extend substantially the entire length of the body. Additionally, at least one pinching member can extend outwardly from the body and can be positioned to cooperate with a pinching member of another belt, and preferably at least two pinching members are equidistantly spaced along the body, pinching the stuffed casing at spaced intervals when the casing is fed between the belts.

The pinching members can contain a V-notch at an outer edge thereof that is positioned opposite an inner edge that is attached to the belt. Opposite V-notches of cooperating pinching members of each belt can come together and nest within each other as the belt is rotated, bringing two pinching members toward each other to interlock. As the pinching members of opposing belts come together, the stuffed casing is positioned between them, and upon the V-notches nesting within each other, they contact the stuffed casing therebetween, effectively pinching the casing between them as they interlock. The pinching members cause the flowable food inside the casing to be pushed away from the pinching members and thus forms at least a partially evacuated space within the casing.

The belt can further comprise a series of cross-wise ridges that extend outwardly from the body on the same side as the pinching members extend. Adjacent the outward extending ridges is a central depression that can run lengthwise along the body at a middle section thereof, dividing the outward ridges into two sections or segments. The central depression can be used to support the stuffed casing therein as it travels through the pinching station. On the opposite side of the outward extending ridges are a series of inwardly extending cross-wise ridges that extend inwardly from the body of the belt and towards an inner central loop area. The inward ridges can act in concert with a rotating wheel or pulley for driving the belts. The body of the belt can further contain an interior material and an exterior material that is different from the interior material.

Methods of pinching spaced intervals along the stuffed casing can comprise advancing the stuffed casing in a machine direction toward a pinching station. The pinching station can include a pair of rotating flexible, unitary composite belts that cooperate with one another, as described above, and are rotated at generally the same speed with a parallel segment of travel in the machine direction with the stuffed casing therebetween. As the stuffed casing passes between the rotating belts, a portion of the stuffed casing is pinched by a pair of complimentary outwardly extending pinching members, one on each belt, that can cooperate with each other to engage the portion of the casing that passes therebetween, thus at least partially evacuating food at that portion to create a pinched section or space in the casing.

Preferably, there will be more than one pinching member provided at equidistant positions along the body of the belt. The casing is pinched by aligning corresponding V-notches of the pinching members to engage the stuffed casing therebetween. Additionally, the pinching members along one of the two belts can be slightly angled such that when its pinching members engage the complimentary pinching members of the other belt they nest together better.

After the stuffed casing is pinched and passes through the pinching station, it can enter a twisting station where the pinched casing is further rotated in an axial direction to reduce the cross-sectional area of the pinched section to create a dividing point or obstruction in the casing.

DETAILED DESCRIPTION OF THE DRAWINGS

A belt and apparatus for forming spaced intervals in a stuffed casing, such as a flexible, composite unitary belt having pinching members, and associated methods for forming the spaced intervals in the stuffed casing, are disclosed herein and illustrated in FIGS. 1-4. The flexible, composite unitary belt can allow the belt to flex and bend as it is being operated and as the stuffed casing is moved between a pair of such belts. Thus, the belt is prevented from stretching which can further prevent pinching and/or tearing of the casing as compared to prior metal linking belts.

Figure 1:
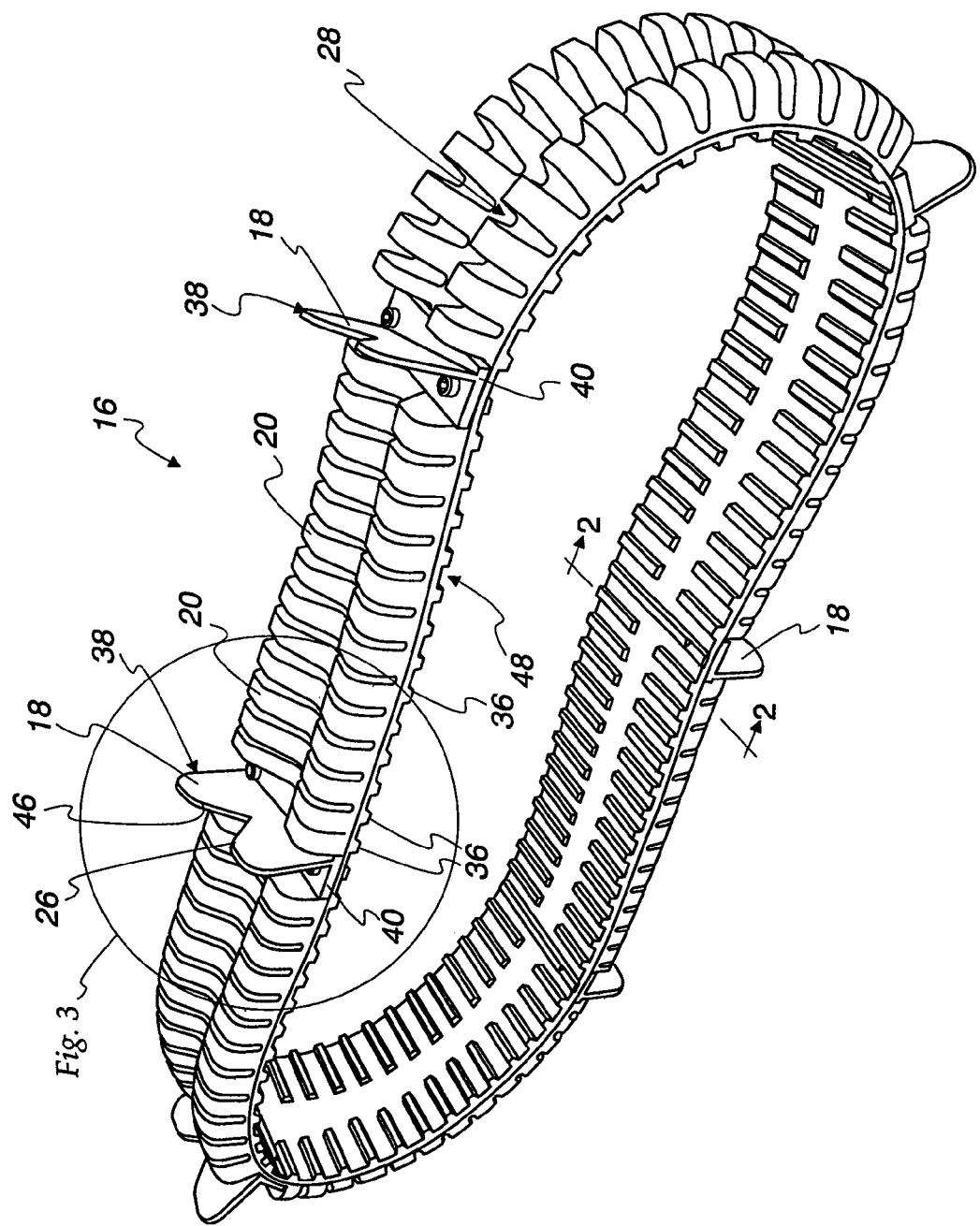
FIG. 1 is a perspective view of a belt that can be used in cooperation with another belt for pinching spaced intervals in filled sausage casings.
Figure 4:
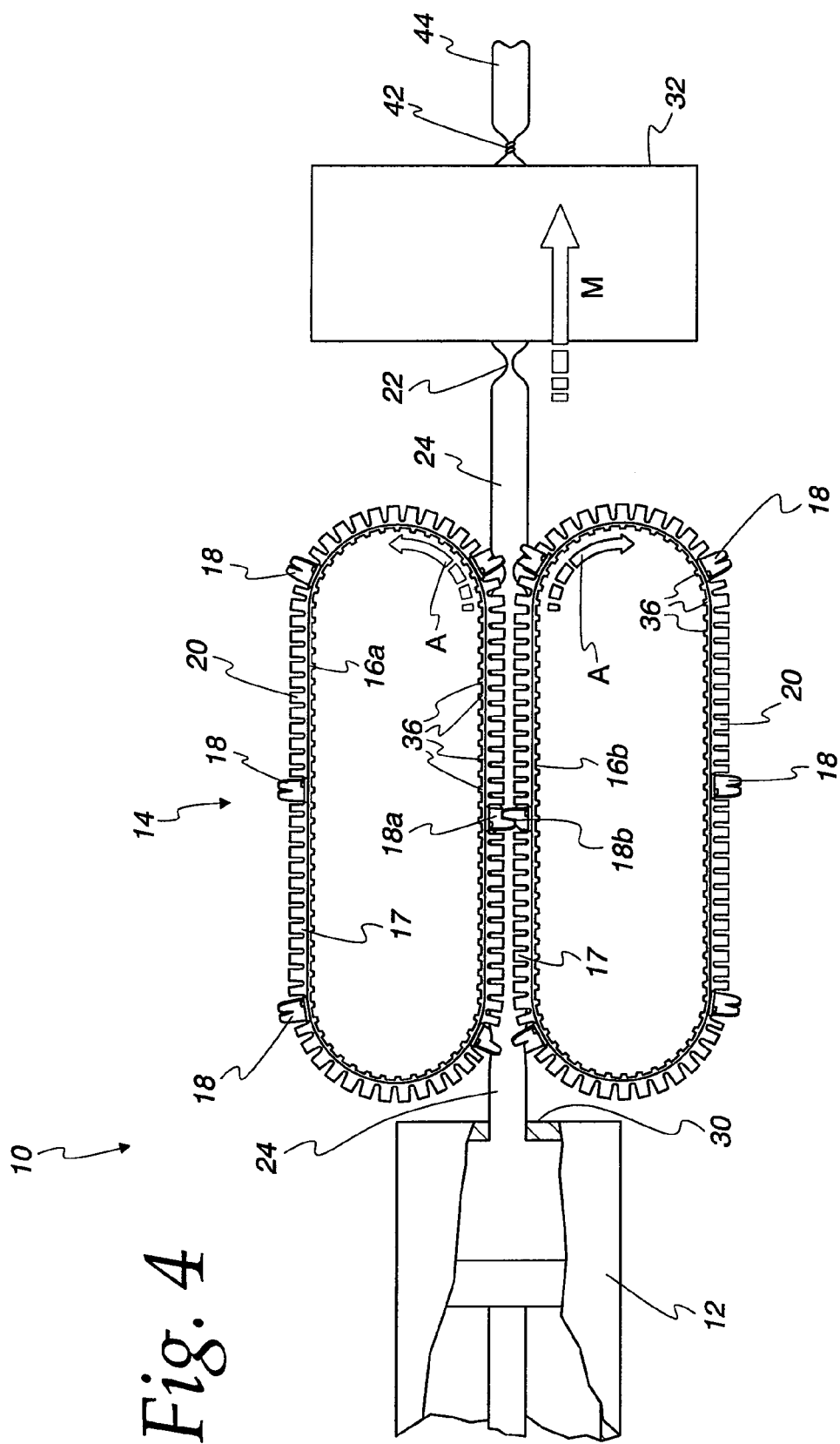
FIG. 4 is a top view of an apparatus for pinching spaced intervals in filled sausage casings.

Turning to FIG. 1, a belt 16 is shown that can be used in cooperation with another similar belt to pinch a stuffed casing 24, such as a stuffed sausage casing, at spaced intervals 22 along an outer surface of the casing 24, as shown and discussed herein in FIG. 4. The belt 16 can comprise a body 17 that has a composite unitary body 17 and is flexible, such that it can bend when operated and rotated along an arcuate path A. The belt 16 is typically provided as a continuous loop. The belt 16 further comprises at least one pinching member 18 or fin extending outwardly from the body 17 and positioned to cooperate with a pinching member 18 of another belt 16b. Preferably, there will be provided at least two or more pinching members 18 along each of the belts 16. The pinching members 18 can be positioned along the belt 16 such that they divide the belt 16 into equidistant segments. These equidistant segments of the belt 16 can correlate to the length of the resulting sausage links. For example, the length of the linked sausages 44 will be generally equal to the distance between adjacent pinching members 18. Furthermore, the pinching members 18 can comprise a V-notch 26 or indentation at an outer edge 38 of the pinching member 18 and opposite an inner edge 40 that is attached to the body 17 of the belt 16. The V-notch 26 can receive the sausage casing 24 therein and create an evacuated space 22 by applying the pinching members 18 to the casing 24. As the pinching members 18 contact the casing 24, they can also nest together tightly or interlock without the pinching members 18 actually touching.

Additionally, to provide better engagement between the pinching members 18 and, in particular, between their corresponding V-notches 26, the pinching members 18 along one or both of the belts can be slightly angled. The slight angle or slant of the pinching members 18 on one belt (La, greater than or less than 90 degrees) and the "straight on" placement (i.e., at an angle of 90 degrees) of the pinching members 18 of the other belt can provide for a better interlock between cooperating pinching members 18 than if both pinching members 18 were provided on their respective belts 16 with no slant (i.e., both at 90 degrees), or both at the same slanted angle. Preferably, the pinching members 18 on either one belt or both belts can be angled such that the pinching members 18 can nest together tightly.

As two cooperating belts 16a and 16b (as shown in FIG. 4) are rotated, their pinching members 18 are likewise rotated along with the belts 16a and 16b. As a pair of complimentary pinching members 18a and 18b are brought into alignment during the rotation of their corresponding belt 16a and 16b, the two opposing pinching members 18a and 18b are brought toward each other to nest together at their respective V-notch 26. This nesting or interlocking occurs for a moment, and as the belts 16a and 16b are further rotated, the filled casing 24 is advanced between them. The pinching members 18a and 18b first contact the outer surface of the casing 24 at an inside surface 46 of the V-notch 26 and then come together and interlock temporarily to apply a pressure to the casing 24 as the space between the pinching members 18 is decreased. This pushes the inner meat filling in opposing directions within the casing 24 to create a partially evacuated space 22. Typically, about ⅛ inch or less of the space within the casing 24 may still contain some stuffed meat filling.

Figure 2:
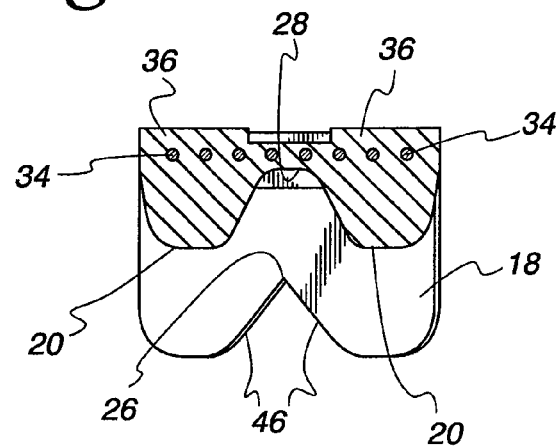
FIG. 2 is a cross-sectional view of the belt taken along line 2-2 in FIG. 1.
Figure 3:
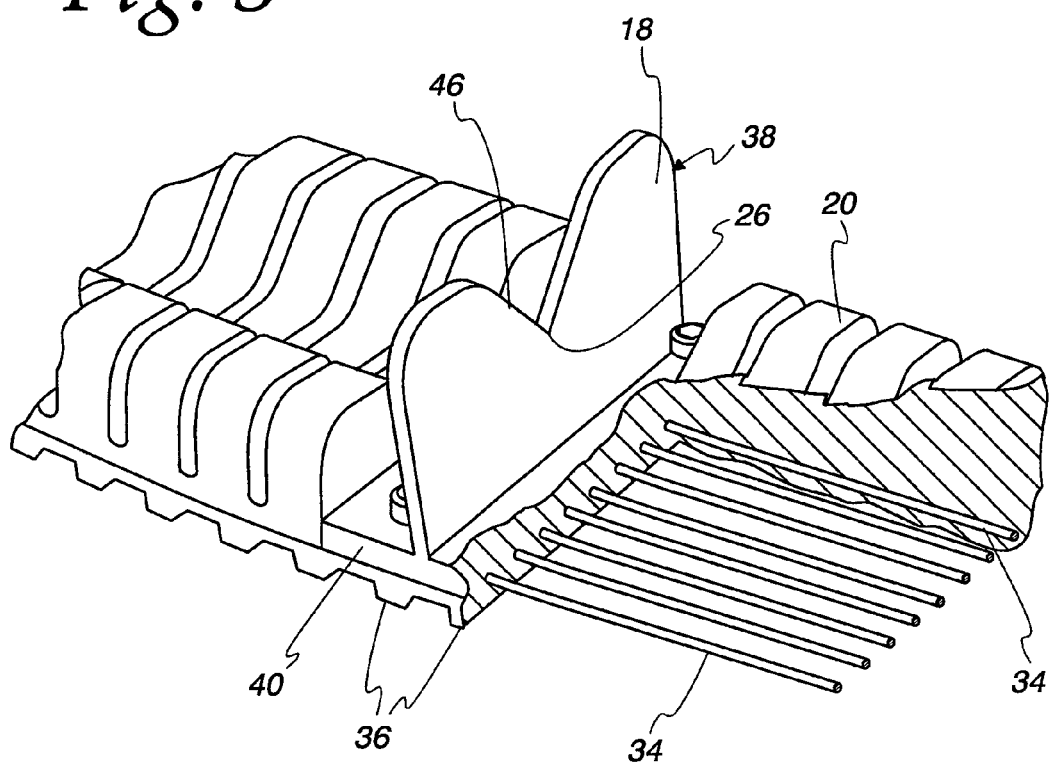
FIG. 3 is a break-away section view of a portion of the belt shown in FIG. 1.

The belt 16 can further comprise a series of cross-wise ridges 20 extending outwardly along the body 17 of the belt 16. These outward ridges 20 can be divided into two adjacent and parallel segments by a central depression 28 extending perpendicularly through the outward ridges 20 and extending through a middle section of the body 17. This central depression 28 can support the filled casing therein, allowing the casing to rest against the depression 28 as it is advanced along the belts 16. The outward ridges 20 can flex and bend with the belt 16 as it is rotated at high speeds that are typical of sausage processing and filling. Additionally, extending through the interior of the body 17 of the belt 16 and typically positioned within the outward ridges 20, is at least one embedded flexible reinforcing cable 34 that can extend substantially the entire length of the body 17, and preferably multiple embedded flexible reinforcing cables 34, as shown in FIG. 2. As illustrated in FIGS. 2 and 3, the flexible reinforcing cables 34 can be positioned within the interior of the body 17, which can then be surrounded by a second, exterior material that makes up the body 17 of the belt 16 and is molded around the reinforcing cables 34, typically having a different material from the interior flexible cable 34. In the aspect shown in FIG. 2, the flexible cables 34 are positioned within the outward ridges 20 and aid in retaining flexibility of the body 17 while reducing stretching.

The body 17 of the belt 16 can further have an irregular outer surface that allows the body 17 to grip and/or transport the sausage casing 24 thereon. For instance, the exterior material of the body 17 that is molded around the reinforcing cables 34 can take on a different shape than the rod-like cables 34. As seen in FIG. 1, the portion of the body 17 that surrounds the reinforcing cables 34 can have a wave-like configuration such that it has a series of hills and valleys across the width of the belt 16. The pinching members 18 are attached to the exterior material of the body 17 at low points of the outward ridges 20, or between breaks in segments of the ridges 20.

The belt 16 also contains a series of inwardly extending cross-wise ridges 36 that extend inwardly from the body 17 and can cooperate with a rotating gear or pulley system to drive the belt 16. In the aspect shown in FIG. 1, the inward ridges 36 can be positioned opposite the outward ridges 20, but on an inner surface 48 of the belt 16. The inward ridges 36 can be slightly elevated from the rest of the inner surface 48 such that it can provide a gripping surface when placed about a rotating gear or the like for rotating the belt 16 along the arcuate path A, as shown in FIG. 4. The inward ridges 36 can also be divided into two adjacent and parallel rows that mirror the arrangement of the outward ridges on the opposite side of the belt 16. The inward ridges 36 are typically aligned across the width of the belt 16 and can be as wide as the belt 16, i.e., where they extend substantially across the entire width of the belt 16, or they can have a length that is shorter than the entire width of the belt 16. Accordingly, the inward ridges 36 can comprise a series of single ridges that are not divided into two rows or, alternatively, the ridges 36 can be divided into greater than two rows.

The dimensions of the belt 16 can vary depending on the process being run and the desired process parameters. In one aspect, the belt 16 can have a diameter between about 12 inches to about 16 inches and a width of between about 2 inches to about 4 inches. The belt can have a thickness in the range of about ⅛ inch to about ½ inch. In another aspect, the belt 16 can have a diameter of about 14 inches, a width of about 2½ inches, and a thickness of about ¼ inch. The pinching members 18 can extend from the body 17 of the belt 16 at a height that is long enough to contact the sausage casing 24. Where there are multiple pinching members 18, the distance between adjacent pinching members 18 is relatively the same all around the perimeter of the belt 16, such that they are equidistantly spaced.

The outward ridges 20 can flex when the belt 16 rotates such that the space between adjacent ridges 20 can expand and contract depending on the rotation position of the belt 16. As the belt 16 is operated, it is run at a relatively fast speed that can keep up with the advancing sausage casing 24 therebetween. The speed of the belt 16 can vary and can be adjusted based on the speed of the process 10. In one aspect, the belt 16 can be operated at a speed of between about 4000 to about 5000 inches/minute. In another aspect, the belt 16 can be operated such that about 800 sausage links/minute are passed between the belts 16 and up to about 1000 links/minute.

The composite belt 16 can be made of a single material or, preferably, can be made of at least two different materials. Where at least two different materials are provided, the exterior material can be a composite material approved for food contact, such as a plastic material like urethane, that encases the different interior material. The interior material can be a flexible synthetic fiber material, such as Kevlar®, and the like. The pinching members 18 can be made from the same plastic material as the exterior body 17 or some other different material.

As the sausage casing 24 is fed between the belts 16 and associated pinching members 18, an evacuated space 22 is pinched into the casing 24 at multiple points along the casing 24. These pinched or spaced areas 22 can have a distance that is great enough to allow subsequent rotation of the casing 24 at this point to create a twisted area or obstruction between sausages. Additionally, the spacing between adjacent pinching members 18 can be chosen to correlate to the desired length of the final food product. In one aspect, where a foot long frankfurter or sausage is desired, the distance between adjacent pinching members 18 will be at least 12 inches, and preferably slightly greater to allow enough space for twisting the casing 24. In another aspect, where a frankfurter having a diameter of about ¼ inch and a length of about 1 inch is desired, then a belt 16 with pinching members 18 spaced apart about 1 inch or slightly greater can be used. The final product lengths can vary and therefore the belt 16 can be chosen to have pinching members 18 that correlate to the desired size. For example, filled sausage casings 24 can be made in lengths that vary from about 1 inch to about 1 foot.

The belt 16 can be manufactured in any number of ways, such as being continuously molded. A continuously molded belt can result in a continuous, circular belt. Alternatively, the belt 16 can be made first as a linear belt that is subsequently seam-welded to make it a continuous loop or circular belt. Other similar techniques known in the art may also be used. The pinching members 18 will preferably be relatively permanently placed on the belt 16, such as by molding the pinching members 18 to the belt 16, rather than providing them as removable members. Different belts 16 can be made having different size pinching members 18 as between belts 16 and/or different spacing arrangements between pinching members 18 as between different belts (while the spacing and sizes of pinching members 18 on the same belt remains the same). When a different sized pinching member 18 is needed on a belt 16 and/or a different spacing between adjacent pinching members 18, the belts 16 can be interchanged such that a belt 16 with the correct size pinching members 18 can be installed. The drive to operate the belts 16 can typically be located on the bottom of the belts, i.e., underneath the belts, so that the belt can be removed from the top by releasing a tensioner and pulling the belt off of the drive. This can allow for easy interchangeability between belts having different sized and/or spaced pinching members 18. Alternatively, the pinching members 18 can be adjustable, such as bolted on, etc.

Turning to FIG. 4, a process 10 is shown that can comprise a food stuffing station 12 followed by a pinching station 14 that results in a food casing 24 that contains spaced intervals 22 of evacuated food pockets within the casing 24. Generally, a single, cylindrical casing is first filled with a flowable food product, such as a ground meat product for making sausages and the like, but any other flowable food product that can be filled into a casing can be provided. The meat can be first stuffed into the casing 24 at a meat stuffing station 12, which can comprise techniques commonly known in the art, such as a stuffing tube that fits inside of the casing 24 and can receive meat inserted into its center and then pushes and compacts the food product into the casing 24. The stuffed casing 24 can then emerge from an exit 30 in the meat stuffing station 12 as a single, long cylindrical stuffed sausage casing or tube and is advanced in a machine direction. In order to create multiple sausages shorter in length, the meat filling within the casing 24 can be separated out at predetermined spaced intervals 22 within the casing 24 to form connected sausages and subsequently twisting the sausage at these spaced intervals 22, at a twisting station 32, to form dividing links 42 between the desired sausage links.

Within the pinching station 14, the sausage casing 24 is fed between a pair of rotating flexible composite, unitary belts 16 that cooperate with one another. The pair of composite belts 16 generally rotate at the same speed. As the sausage casing 24 passes between the belts 16 it is pinched by a pair of pinching members 18, one on each belt 16, such that the engagement of opposite pinching members 18 provides spaced intervals 22 or sections within the sausage casing 24 as it passes therebetween. The spaced intervals 22 are formed by the pinching members 18 coming together and aligning corresponding V-notches to engage and contact the stuffed casing 24 therebetween and applying a force to the outside surface of the sausage casing 24 that subsequently pushes the meat filling inside away from the nested area of the pinching members 18, therefore creating a space or evacuated portion of the casing 24 where relatively no meat filling remains. Upon exiting the pinching station 14, the sausage casing 24 continues to travel in a machine direction towards a twisting station 32. Multiple smaller links of sausages enter the twisting station 32 that are separated by the equidistant evacuated spaces 22 within the casing 24. Upon entering the twisting station 32, the sausage casing 24 can be twisted or rotated in an axial direction to reduce the cross-sectional area along these evacuated portions 22 to collapse the casing 24 at this portion and to form an obstruction that separates adjacent sausage links. Thus, resulting in the final sausage product 44 linked or connected to one another at these twisted portions.

Although the belt for and method of forming spaced intervals in a stuffed casing is described in terms of sausages, it should be understood that other types of food products can similarly be used. For instance, other types of flowable food products packaged in a casing, such as any other types of meats, cheeses, and the like can be run through the belts as described herein to form the spaced intervals in the casing.

From the foregoing, it will be appreciated a belt and apparatus for forming spaced intervals in a stuffed casing and method thereof are provided such that numerous modifications and variations could be made thereto by those skilled in the art without departing from the scope of the belt and method set forth in the claims. Therefore, the disclosure is not limited to the aspects and embodiments described hereinabove, or to any particular embodiments. Various modifications to the belt and/or method of forming spaced intervals within a stuffed casing could be made which can result in substantially the same belts and method.

What is claimed is:

1. A belt for cooperating with another belt to pinch a stuffed casing at spaced intervals, the belt comprising:
   a flexible, unitary composite body with at least one embedded flexible reinforcing member extending substantially the entire length of the body; and
   at least one pinching member extending outwardly from the body and positioned for cooperating with a pinching member of another belt to pinch a stuffed casing at spaced intervals when fed between a pair of belts.

2. The belt of claim 1, wherein a series of cross-wise ridges extend outwardly from the body.

3. The belt of claim 2, wherein a central depression runs lengthwise along the body at a middle section thereof.

4. The belt of claim 1, wherein a series of inwardly extending cross-wise ridges extend inwardly from the body.

5. The belt of claim 1, wherein the pinching member has a V-notch at an outer edge thereof, opposite an inner edge that is attached to the belt.

6. The belt of claim 1, wherein the body includes a plurality of pinching members with each pair of adjacent pinching members being equidistant.

7. The belt of claim 1, wherein the reinforcing member is made from a Kevlar® material and an exterior material is made from a urethane material.

8. The belt of claim 1, wherein the body forms a continuous loop.

9. The belt of claim 1, wherein the body has two embedded flexible reinforcing members extending substantially the entire length of the body.

10. The belt of claim 1, wherein the flexible reinforcing member is a cable.

11. A method of pinching spaced intervals along a stuffed casing, the method comprising:
    advancing the stuffed casing in a machine direction;
    rotating a pair of flexible, unitary composite belts, each having a body with at least one embedded flexible reinforcing member extending substantially the entire length of the body with the stuffed casing therebetween;
    pinching a portion of the casing with a pair of complimentary outwardly extending pinching members, one from each belt, to create a pinched section in the casing.

12. The method of claim 11, wherein the casing is pinched by aligning corresponding V-notches of the pinching members to nest together and engage the stuffed casing therebetween.

13. The method of claim 12, wherein the pinching members are provided at spaced intervals along the belt.

14. The method of claim 13, wherein the pair of composite belts rotate at generally the same speed.

15. The method of claim 11, wherein the composite belts have an interior material that differs from an exterior material.

16. The method of claim 15, wherein the interior material is a Kevlar® material and the exterior material is a urethane material.

17. The method of claim 11, wherein the pinching members along one of the two belts are at different angles than the pinching members on the other belt.

18. The method of claim 11, wherein the casing is stuffed with a flowable food product.

19. The method of claim 18, wherein the stuffed casing is a meat product.

20. An apparatus for pinching spaced intervals along a stuffed casing, the apparatus comprising:
    a pinching station having two cooperating belts, each belt comprising a flexible, unitary composite body with at least one embedded flexible reinforcing member extending substantially the entire length of the body; and
    at least one pinching member extending outwardly from the body of each belt and positioned to cooperate with each other to pinch the stuffed casing at spaced intervals when received between the belts.

* * * * *